Jan. 19, 1965 G. E. NICHOLS 3,166,194
DESK MOUNT
Filed Aug. 17, 1962 2 Sheets-Sheet 1
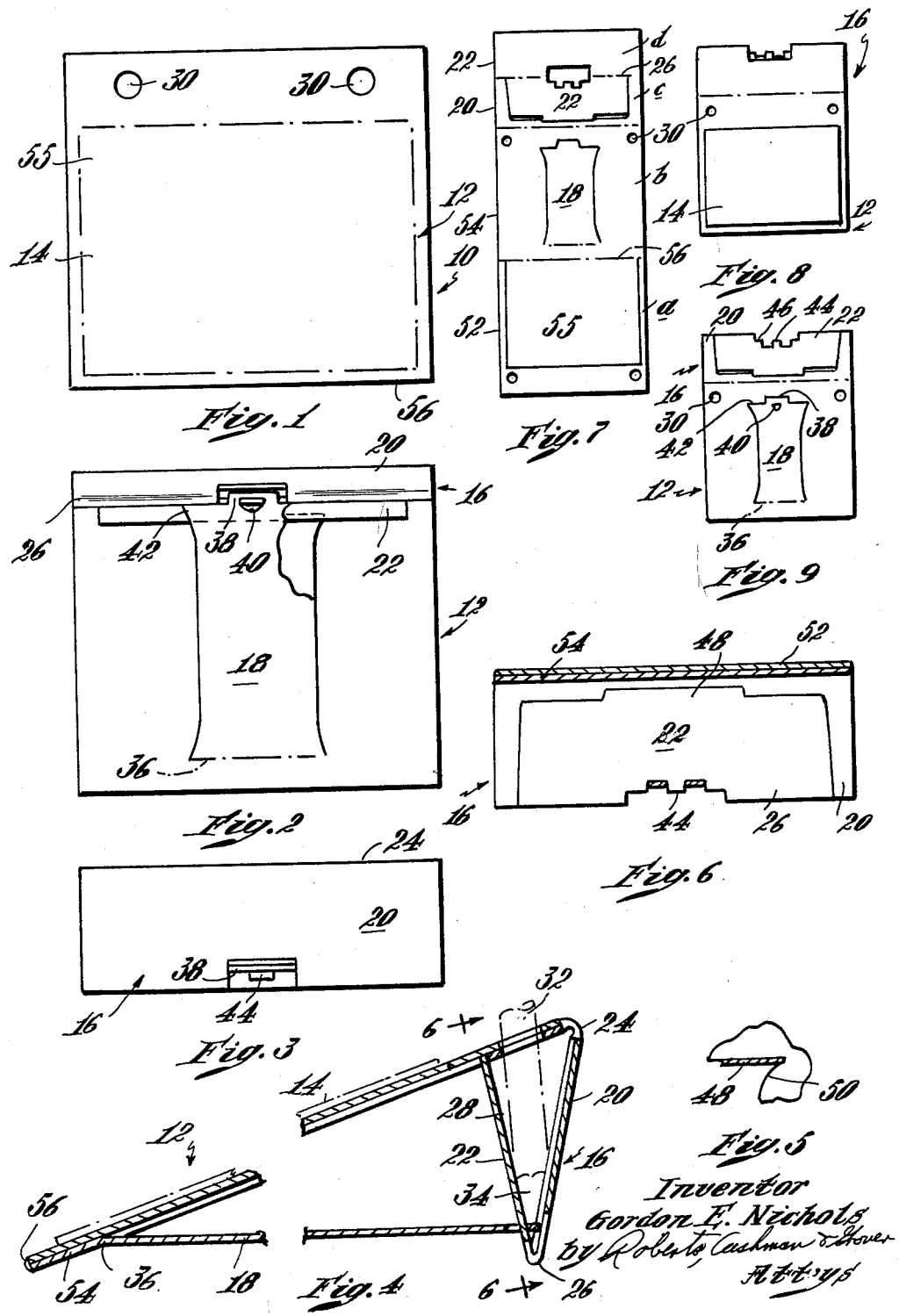

Jan. 19, 1965  G. E. NICHOLS  3,166,194
DESK MOUNT
Filed Aug. 17, 1962  2 Sheets-Sheet 2

United States Patent Office 3,166,194
Patented Jan. 19, 1965

3,166,194
DESK MOUNT
Gordon E. Nichols, Middleboro, Mass., assignor to Winthrop-Atkins Co., Inc., Middleboro, Mass., a corporation of Massachusetts
Filed Aug. 17, 1962, Ser. No. 217,625
4 Claims. (Cl. 211—49)

This invention relates to desk mounts and has for its principal objects to provide a mount for supporting, in addition to a calendar pad, writing materials; to provide a mount which is attractive; sturdy; economical of material; and inexpensive to manufacture.

As herein illustrated, the mount comprises two parts hingedly joined along adjacent edges for disposition at an angle to each other, an extension hingedly connected to the distal end of one part and extending upwardly between the parts, means on the other part cooperative with the extension to hold the extension at an angle to the part with which it is associated to provide a wedge-shaped pocket between the part and the extension, and one or more openings in one of the parts affording access to the pocket. The means operative to hold the extension at at an angle to the part with which it is associated may comprise an opening in the other part and a tongue at the distal end of the extension engageable therewith, or a brace connected to the one part engageable with an opening in the extension. In either form of the invention the parts, cooperative to hold the extension at an angle to the part with which it is associated, are also operative to hold the parts at an angle to each other. The parts provide front and back panels, the front panel being adapted to have a pad attached thereto and the extension may be hingedly connected to the distal end of the front panel so as to extend inwardly and upwardly into abutting engagement with the back panel, or may be hingedly connected to the back panel so as to extend inwardly and upwardly into abutting engagement with the front panel. The openings, affording access to the pocket, of which there may be round openings for receiving writing implements and a rectangular opening for receiving a memorandum pad, may be situated in the front panel, the back panel, or so as to intersect the hinge between the panels.

The invention will now be described in greater detail with reference to the accompanying drawings wherein:

FIG. 1 is a front elevation of the mount in one of its forms;

FIG. 2 is a bottom view;

FIG. 3 is a rear view;

FIG. 4 is a vertical section taken intermediate the ends of the mount;

FIG. 5 is a fragmentary detail of locking means for holding the walls of the leg and the leg in operative position;

FIG. 6 is an elevation taken on the line 6—6 of FIG. 4;

FIG. 7 is a plan view of the blank from which the mount is made;

FIG. 8 is a plan view of the front side of the blank folded preparatory to setting up;

FIG. 9 is a back view of the blank shown in FIG. 8;

Figure 10:
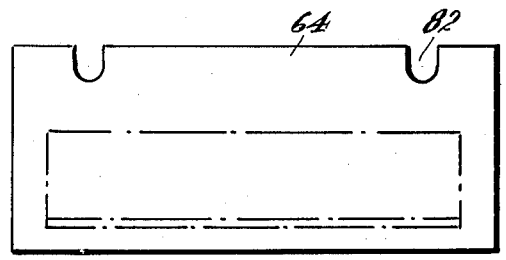
FIG. 10 is a front elevation of a second form of the invention.
Figure 12:
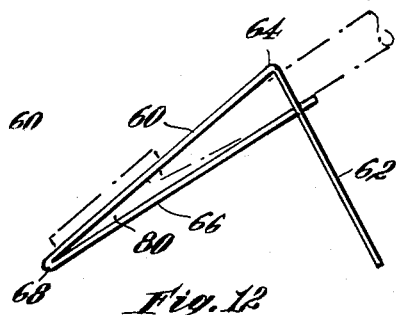
FIG. 12 is a side elevation of the mount shown in FIG. 10.
Figure 11:
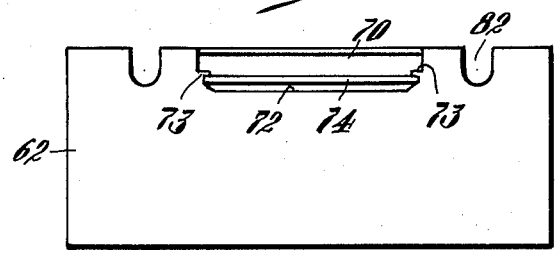
FIG. 11 is a rear elevation of the mount shown in FIG. 10.

Referring to the drawings (FIGS. 1 to 6 inclusive), the mount 10, in one form, comprises a rearwardly inclined support 12 to which a calendar pad 14 may be suitably attached, a leg 16 connected thereto, and a brace 18 operatively associated with the support and leg to hold them in mutually supporting position.

The leg 16 is comprised of upwardly diverging walls 20 and 22, the upper end of the wall 20 being connected by a flexible hinge 24 to the upper edge of the support and at its lower end by a hinge 26 to the lower end of the wall 22. The upper end of the wall 22 is held in abutting engagement with the underside of the support 12 at an angle to the wall 20 so as to provide a wedge-shaped pocket 28 for receiving a writing implement 32, the dihedral angle of the pocket being less than the conoidal angle at the point 34 of the implement so as frictionally to engage the same. The support has transversely thereof one or more openings 30 which are in communication with the pocket 28 and which permit thrusting a writing implement into the pocket so as to hold it upright. Optionally, an elongate opening may be provided to permit inserting a memorandum pad into the pocket. The mount is comprised of resiliently flexible sheet material so that when the walls 20 and 22 are deflected, that is, forced apart by insertion of a pencil point or the end of a memorandum pad therebetween, they will resist such deflection and thereby grip the inserted end.

The brace 18 (FIGS. 2 and 3) is connected at its forward end to the support by a hinge 36 and has at its rear end means for connecting it to the leg to hold the latter at the desired angle with reference to the support and simultaneously to position and hold the wall 22 into the proper angular relation to the wall 20. To this end the brace 18 has a tongue 38 containing an opening 40 and laterally extending shoulders 42—42, and the wall 22 contains an opening into which projects a tongue 44 and shoulders 46—46. The opening 40 in the tongue of the brace is engaged over the tongue 44 of the wall 22 and the shoulders 42—42 of the brace are engaged with the shoulders 46—46 of the wall 22, thus locking the wall 22 and hence the leg 16 at a predetermined angle relative to the support 12 and the walls at a predetermined angle to each other. The upper end of the wall 22 has a tongue 48 (FIG. 6), the opposite corners of which are engaged with notches 50—50 (FIG. 5) formed in the support at the end of the opening from which the brace is cut which prevents its movement rearwardly or forwardly after it is engaged within the opening.

The support 12 may be of single ply construction, in which case, the brace 18 will be cut out of the support. As herein illustrated, however, the support is comprised of two plies 52 and 54, the lower ply containing the brace and the upper ply constituting a cover panel 55 connected at its lower edge by a hinge 56 to the lower ply so that it may be pulled forwardly about the hinge to expose its underside and the surface of the ply 52 thereby providing normally concealed surfaces upon which may be printed confidential information.

The blank from which the mount is made is shown in FIG. 7 with the two plies of the support, the two walls of the leg, and the brace correspondingly labeled. The parts *a* and *b* are folded on the hinge 56 and the parts *c* and *d* on the hinge 26 and bound together by a wrapping of suitable decorative paper (FIGS. 8 and 9), whereupon suitable incisions are made to form the leg 22, the brace 18, the cover panel 55 and the means for locking the brace and the walls of the leg in operative position.

FIGS. 10 to 13 inclusive, show a first modification of the mount in which parts 60 and 62, comprised of substantially rectangular sheets of stiff resilient paperboard, are connected at their adjacent edges by a hinge 64 so that they may be disposed with their lower or distal edges in spaced parallel relation to provide a substantially A-shaped support. An extension 66 is connected by a hinge 68 to the distal edge of the part 60 so as to extend inwardly and upwardly into engagement with the part 62. The extension 66 is substantially coextensive with the part 60 and is held at an angle with respect thereto by engagement of the distal end of the extension 60 with an opening 70 in the part 62. The opening 70 is formed in the part 62 adjacent and parallel to the hinge 64 and has a recess 72 narrower than the opening 70 and shoulders 73—73 along its lower edge. The extension 62 has a tongue 74 with flared end portions 76—76, engageable within the recess 72 behind the shoulders 73—73 to hold the extension at an angle to the part 60. The flared end portions 76—76, in conjunction with the shoulder portions 78—78 by abutting engagement with the outer and inner sides of the part 62, operate to hold the parts 60 and 62 at an angle to each other.

The extension 66 provides, in conjunction with the part 60, a wedge-shaped pocket 80 and access thereto is afforded by means of openings 82 formed at the intersection of the parts 60 and 62, that is, intersecting the hinge 64. Since the pocket inclines upwardly behind the part 60, the greater portion of the openings 82 are formed in the part 62 so that a pencil or pen may be thrust through the openings in the pocket from the rear side. The portions of the openings 82 intersecting or formed in the front part 60 provide markers to enable one to insert a pencil or pen into an opening without turning the mount backside-to in order to determine the location of the opening.

The opening 70 for receiving the locking tongue of the extension is of substantially rectangular configuration and provides an opening to the pocket through which a memorandum pad may be thrust into the pocket.

The calendar pad is attached to the front face of the part 60.

Figure 13:
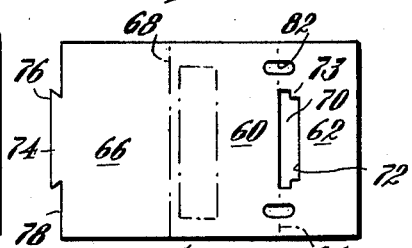
FIG. 13 is a plan view of the blank for the mount shown in FIGS. 10 to 12 inclusive.

As illustrated in FIG. 13, the blank for making the mount is of very simple construction, comprised of flat sheet board which may be fed from strip board to a punching machine and cut out in a single operation, either covered or uncovered. The blank comprises the extension 66 with its tongue 74, the part 60 and the part 62, with the openings 82 crossing the hinge 64 and the opening 70 adjacent the hinge.

Figure 14:
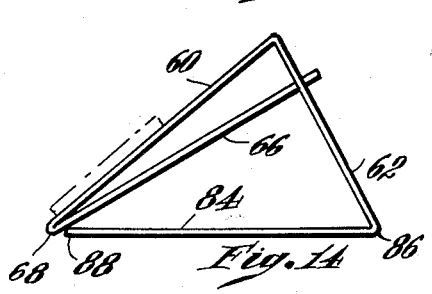
FIG. 14 is a side elevation of a third form of the invention, substantially like that shown in FIGS. 10 to 12 inclusive.

A second modification of the mount is shown in FIG. 14 which differs from that shown in FIGS. 10 to 13 inclusive, only in the addition of an extension 84 to the part 62, connected to the distal end of the latter by a hinge 86 so that it may be disposed in a horizontal position with its forward or distal edge 88 adjacent the hinge 68 at the junction of the part 60 and the extension 66.

Figure 15:
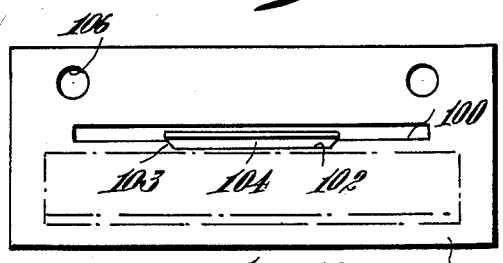
FIG. 15 is a front elevation of a fourth form of the invention.
Figure 16:
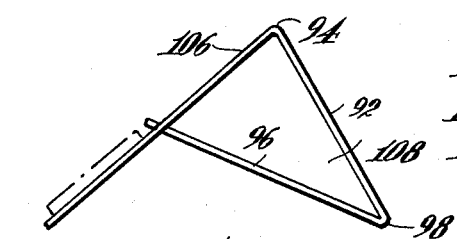
FIG. 16 is a side elevation of the mount shown in FIG. 15.
Figure 17:
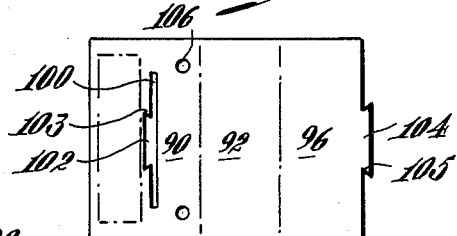
FIG. 17 is a plan view of a blank from which the mount shown in FIGS. 15 and 16 is made.

A third modification of the mount is shown in FIGS. 15 to 17 inclusive, wherein parts 90 and 92 forming, respectively, the front and back sides of the support, are connected by a hinge 94 so that their distal edges may be disposed in spaced parallel relation to form an A-shaped support. An extension 96 is connected to the distal edge of the back part 92 by a hinge 98 so as to extend upwardly between the parts into engagement with the front part 90. The front part 90 has a horizontal slot 100 containing a narrow recess 102 at its lower edge, having undercut shoulders 103—103 at its opposite ends, and the distal end of the extension 96 has a tongue 104 with flared shoulders 105—105 which is adapted to be depressed into the recess 102 beneath the shoulders 103—103 so as to hold the extension 96 at an angle to the part 92 and to hold the parts 90 and 92 at an angle to each other. The front part 90 contains openings 106 affording access to the pocket 108 provided between the back part 92 and the extension 96, and a calendar pad is attached to the front part below the slot 100. The blank from which the mount is folded is shown in FIG. 17 with the parts correspondingly numbered.

Figure 18:
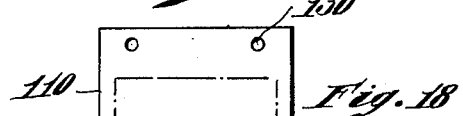
FIG. 18 is a front elevation of a fifth form of the invention.
Figure 20:
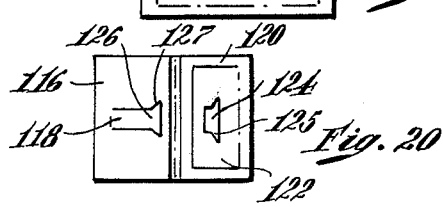
FIG. 20 is a plan view of the mount shown in FIGS. 18 and 19, with the front and back panels disposed in a common plane.
Figure 19:
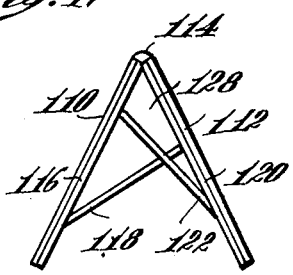
FIG. 19 is a side elevation of the mount shown in FIG. 18.

A fourth modification is shown in FIGS. 18 to 20 inclusive, wherein there are front and back parts 110 and 112 connected at their adjacent edges by a hinge 114 so as to be disposed at an angle to each other. A board 116 is secured to the inner side of the front part 110, for example, by a binding which is applied to the outer face of the part 110 and folded over the edges onto the inner side of the board 116. A brace 118 is cut out of the board 116 so as to be hingedly connected at its lower end thereto and to be foldable rearwardly therefrom toward the part 112. A board 120 is similarly attached to the inner side of the part 112 and has cut out of it a panel 122 which is hinged at its lower edge so as to be foldable forwardly therefrom into abutting engagement with the inner side of the board 116. The panel 122 contains an opening 124 having notches 125—125 at its ends and the brace 118 has a tongue 126 with shoulders 127—127 for engagement with the notches in the opening 124, in such fashion as to hold the panel 122 at an angle to the part 112 to provide a wedge-shaped pocket 128 and, by engagement with the part 112, to hold the parts 110 and 112 at an angle to each other. Access to the pocket 128 is afforded through openings 130 formed in the parts 110 and 116.

As related with respect to the first form of the invention, the several modifications are comprised of a stiff, resilient sheet material so that the walls of the wedge-shaped pocket, provided by the structure of each mount, yieldingly resist displacement and thus will frictionally grip a writing implement or a memorandum pad thrust into the pocket.

It should be understood that the present disclosure is for the purpose of illustration only and that this invention includes all modifications and equivalents which fall within the scope of the appended claims.

I claim:

1. A structure comprising a first part, a second part hingedly connected to one end of the first part, each of said first and second parts comprising superposed, substantially coextensive panels, said second part being adapted to be placed at an angle to the first part, a third part hingedly connected to the distal end of the second part, said third part being formed out of one of the panels of the second part, said third part being adapted to be placed at an angle to the second part with its distal end engaged with the first part closer to the one end of the first part than the other, means on one of the panels of the first part, cooperable with the distal end of the third part, to hold said end spaced from and parallel to the hinge joining the first and second parts such that the dihedral angle between the second and third parts corresponds substantially to the conoidal angle of a writing implement, said second and third parts defining a hollow supporting leg of triangular section, the divergent ends of which are based on the first part and the hinged convergent ends of which are spaced from and parallel to the other end of the first part and form conjointly therewith supporting feet, and a fourth part formed out of one of the panels of the first part, said fourth part being hingedly connected to the first part near the distal end thereof and extending therefrom into engagement with the hinged convergent ends of the second and third parts, said hollow supporting leg defining a pocket, the bottom of which is spaced from the first part and is formed by said dihedral angle, and said first part containing holes through it situated between the divergent ends of the second and third parts on the median of the dihedral angle which affords access to the pocket.

2. A structure according to claim 1, wherein the panel of the first part, with which the third part has engagement, contains transversely spaced notches within which portions of the distal end of the third part are engaged.

3. A structure according to claim 1, wherein the fourth part is a brace and there is means at its distal end, interengageable with the second and third parts adjacent their convergent ends, operative to hold said second and third parts at a predetermined angle relative to each other.

4. A structure according to claim 1, wherein the third part has an opening through which the distal end of the fourth part projects into abutting engagement with the second part, and the intersecting portions of the third and fourth parts have interlocking means fixing the angular position of the third part relative to the first part and the angular position of the third part relative to the second part.

References Cited in the file of this patent

UNITED STATES PATENTS

| | | |
|---|---|---|
| 1,386,700 | Gilbert | Aug. 9, 1921 |
| 1,705,116 | Howland | Mar. 12, 1929 |
| 2,911,106 | McCormick | Nov. 3, 1959 |
| 2,920,409 | Sampson | Jan. 12, 1960 |
| 2,946,545 | Sampson | July 26, 1960 |
| 2,975,905 | Foland | Mar. 21, 1961 |

FOREIGN PATENTS

| | | |
|---|---|---|
| 599,742 | Canada | June 14, 1960 |